(12) United States Patent
Cryer

(10) Patent No.: US 7,270,201 B1
(45) Date of Patent: Sep. 18, 2007

(54) TRAILER MOVING VEHICLE

(75) Inventor: William Cryer, Bradenton, FL (US)

(73) Assignee: Coach House, Inc., Nokomis, FL (US)

( * ) Notice: Subject to any disclaimer, the term of this patent is extended or adjusted under 35 U.S.C. 154(b) by 154 days.

(21) Appl. No.: 11/174,814

(22) Filed: Jul. 5, 2005

(51) Int. Cl.
*B62D 51/04* (2006.01)

(52) U.S. Cl. ..................... 180/19.2; 180/6.48

(58) Field of Classification Search ........... 180/19.2, 180/19.3, 14.2, 14.4, 6.48
See application file for complete search history.

(56) References Cited

U.S. PATENT DOCUMENTS

| | | | | |
|---|---|---|---|---|
| 2,846,018 A | * | 8/1958 | Puckett | 187/231 |
| 3,166,141 A | * | 1/1965 | Shields et al. | 180/21 |
| 3,254,900 A | * | 6/1966 | Allen | 280/29 |
| 4,629,020 A | * | 12/1986 | Thurman | 180/19.2 |
| 4,629,391 A | * | 12/1986 | Soyk et al. | 414/563 |
| 4,973,206 A | * | 11/1990 | Engle | 410/67 |
| 5,139,102 A | | 8/1992 | Pocapalia | 180/19.2 |
| 7,040,425 B2 | * | 5/2006 | Hammonds | 180/6.48 |

\* cited by examiner

*Primary Examiner*—Tony Winner
(74) *Attorney, Agent, or Firm*—Gifford, Krass, Sprinkle, Anderson & Citkowski, P.C.

(57) ABSTRACT

A vehicle for moving trailers that are not coupled to their usual towing vehicle in which steering is conducted by an operator walking next to the vehicle and moving separate ones of a pair of levers for a pair of hydraulically driven wheels that control speed and direction of rotation. Two sets of levers are provided, one at each side of the vehicle so that the operator can use either set.

19 Claims, 4 Drawing Sheets

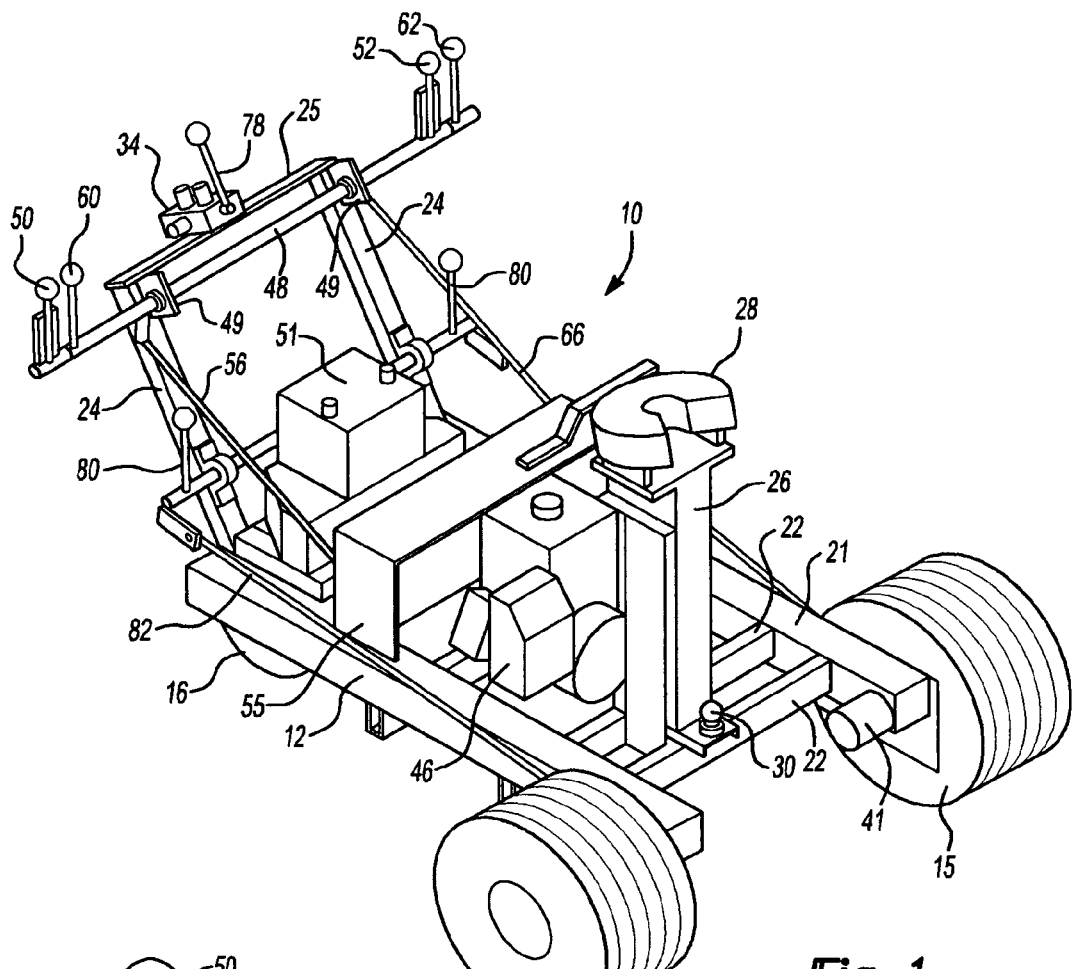
Fig-1
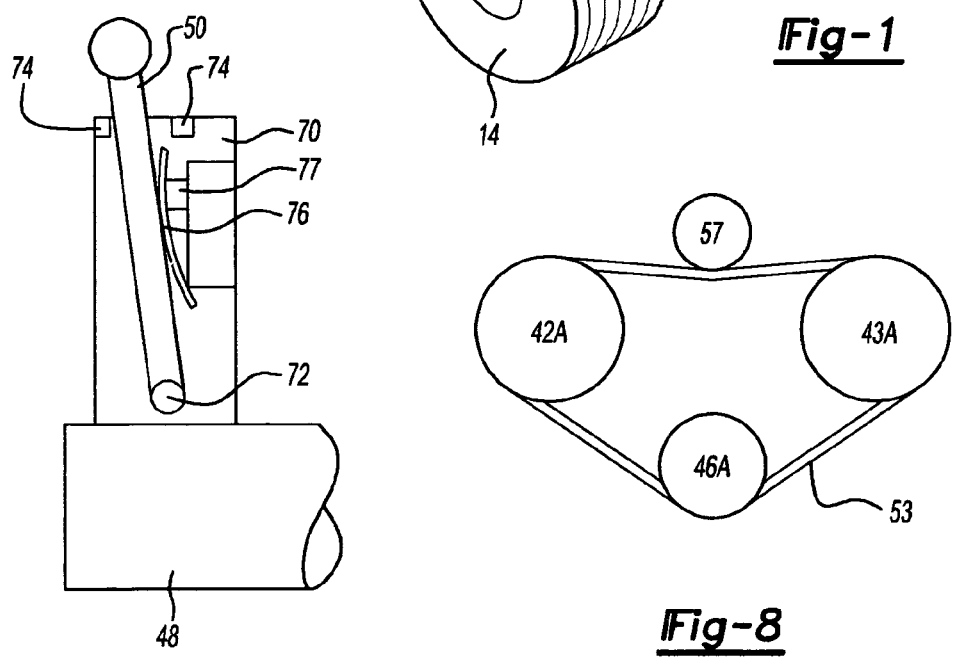
Fig-6
Fig-8

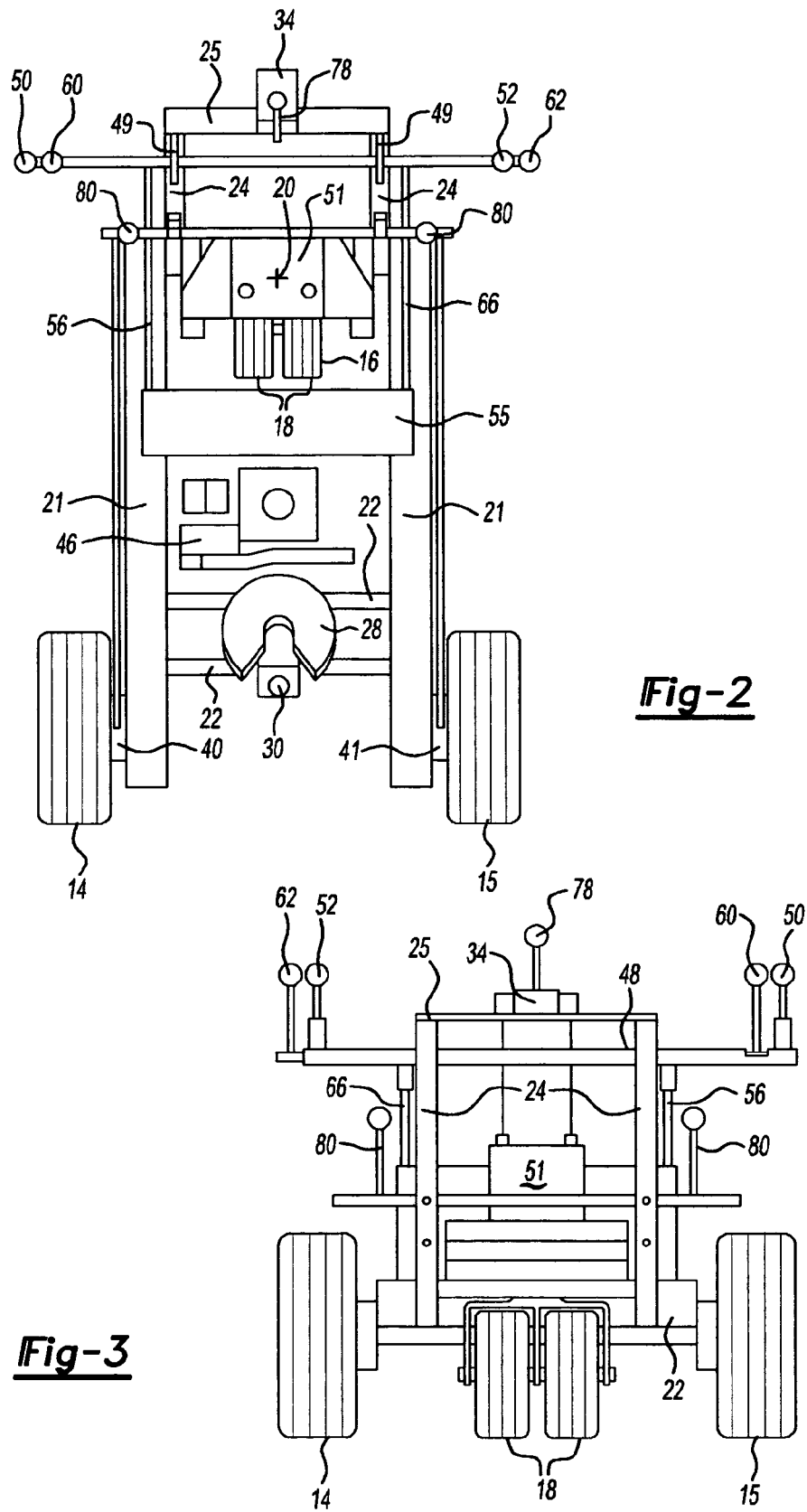

TRAILER MOVING VEHICLE

FIELD OF THE INVENTION

This invention relates to motor vehicles controlled by a walking attendant and more particularly to such vehicle used to maneuver trailers uncoupled from their usual towing vehicles

BACKGROUND OF THE INVENTION

A variety of trailer moving vehicles have been provided for use in moving trailers unhitched from their usual towing vehicle within a confined area. The typical trailer maneuvering device is powered by a gasoline engine or hydraulically. Also, such vehicles have a common support platform with a set of drive wheels to move the platform and a steering wheel guided by the walking attendant through a steering mechanism such as a lever. Also, the usual vehicle platform has a ball hitch assembly can be received by a ball coupling on the tongue of a trailer or fifth wheel coupling for fifth wheel type recreational trailers. The vehicles can either pull or push and during such movement the operator or attendant moves the lever to control the directional movement of the vehicle.

SUMMARY OF THE INVENTION

Unlike most of the prior art trailer moving vehicles, the present invention is concerned with one in which movement is achieved by a pair of drive wheels that are controlled separately to achieve steering.

The arrangement is such that ninety degree turns can be achieved if necessary because steering is not dependent on forward and rearward movement of the vehicle. With the present vehicle the steering is achieved by movement of a separate lever for each wheel to control the directional movement and speed of a hydraulic motor driving one of the drive wheels. A pair of levers are used to control a pair of wheels to achieve steering and speed. In addition, such lever controls for both sides of the vehicle are duplicated at both sides of the vehicle so that the walking attendant has his choice and a wide range of movement for observation of the vehicle and the trailer which is being moved. The vehicle of the present invention is powered by a gasoline engine which runs constantly at a uniform speed thus eliminating the need for throttle or throttle controls.

It is the an object of the invention to provide a vehicle for moving trailers which are unhitched from their usual towing vehicle and are controlled by movement of levers to regulate the delivery of hydraulic fluid to hydraulic motors to determine their direction and speed of rotation to control steering and speed of the vehicle.

Another object of the invention is to provide for a vehicle to move unhitches trailers in which a walking attendant can control the vehicle movement by manipulating a pair of levers with one hand to control direction and speed.

Yet another object of the invention is to provide a vehicle for moving unhitched trailers in which controls to regulate steering and speed are duplicated at opposite sides of the vehicle to afford a wide range of positions relative to the moving vehicle and the trailer being moved.

The objects of the invention are attained by a vehicle for moving trailers uncoupled from their usual towing vehicle having an elongated chassis with a pair of drive wheels supported at spaced opposite sides at the front of the chassis for rotation about a common axis transverse to the chassis. In addition, the chassis is supported by a caster wheel assembly at the rear of the chassis to follow movements of the frame or chassis. The chassis supports trailer coupler means for coupling to fifth wheel trailers or to trailers having couplers at the end of tow bars. The drive wheels are driven hydraulically by rotary motors with a separate motor for each wheel. Steering is accomplished by a separate pivoting lever for each of the drive wheels and two pair of levers for controlling both drive wheels are disposed at both sides of the vehicle for a working attendant to manipulate one or the other of the pairs of levers with one hand.

DESCRIPTION OF THE DRAWINGS

FIG. 1 is a perspective view of the trailer moving vehicle embodying the invention;

FIG. 2 is a top plan view of the vehicle;

FIG. 3 is a rear view of the vehicle as it would appear to an operator of the vehicle;

FIG. 6 is a view of one of the control levers at a further enlarged scale;

FIG. 8 is a view of the drive system for the hydraulic pumps.

DETAILED DESCRIPTION

Figure 4:
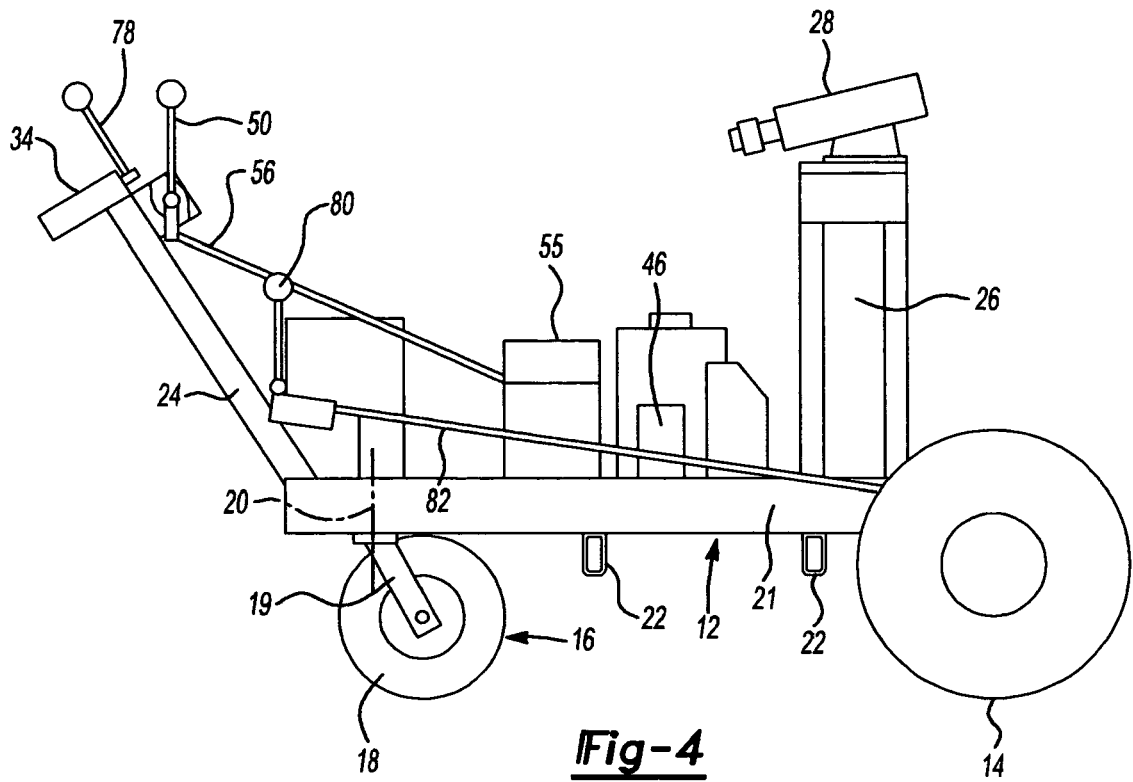
FIG. 4 is an elevation from one side of the vehicle seen in FIG. 1.

The trailer moving vehicle embodying the invention is designated generally at 10 and includes a generally rectangular frame 12 suspended in elevated horizontal position by a pair of forward drive wheels 14 and 15 and a rearward caster wheel assembly 16. The drive wheels 14 and 15 are supported independently of each other for rotation at opposite sides of the vehicle frame 12. The caster wheel assembly 16 includes a pair of adjacent wheels 18 which are freely rotatable and are supported by a bracket assembly 19 as seen in FIG. 2 and having free pivotal movement about a vertical axis indicated at 20 in FIGS. 2 and 4 in response to movement of the frame 12.

The frame 12 is a weldment with a generally box like side stringers 21 and cross frame members 22. The rear of the frame 12 is provided with a upwardly and rearwardly angled frame members 24 extending from the side frame members 20 and joined at the top by a transverse frame member 25 to provide support for various operator controls at a waist height for convenient access.

Figure 7:
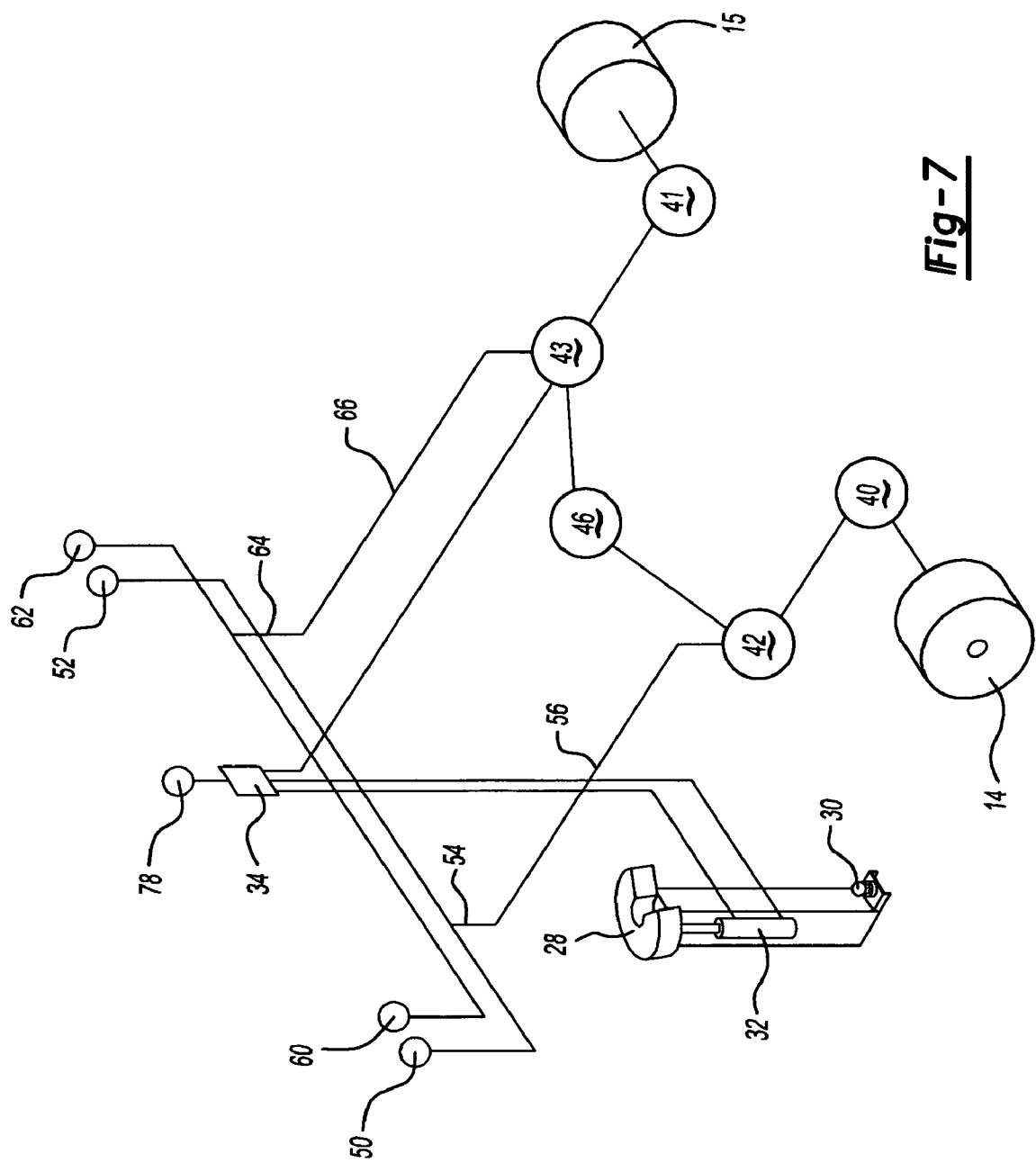
FIG. 7 is a diagrammatic perspective view of the steering control system of the vehicle.

The wheel supported frame 12 is for the purpose of supporting and moving hydraulically actuated hitch lift designated generally at 26. The hydraulic lift supports a fifth wheel coupling 28 at the upper end for receiving the complementary fifth wheel coupling on the trailer to be maneuvered. As seen in FIG. 1, the hydraulic lift 26 also is provided with a ball coupler 30 for connecting to the complementary ball receiving coupling on the tongue of a trailer to be maneuvered. Both the fifth wheel coupling 28 and the ball coupling 30 can be moved vertically to selected positions in response to a double acting hydraulic cylinder 32 (FIG. 7) under the control of a valve 34 mounted centrally of the vehicle at the frame member 25 to deliver hydraulic fluid to one or the other of the ends of hydraulic cylinder 32.

Each of the pair of drive wheels 14 and 15 is driven by a separate rotary hydraulic motor 40 and 41, respectively. The motors 40 is supplied with hydraulic fluid from a separate hydraulic pump 42 and motor 41 is supplied by a separate hydraulic pump 43. Each of the pumps 42 and 43 is controlled by a longitudinally moveable control rod 44 and 45, respectively, to deliver hydraulic fluid to cause the motor to rotate in either selected direction and to act as a brake in the neutral position.

Each of the two pumps 42 and 43 are driven simultaneously by a single small engine 46 operating at a constant speed to supply hydraulic fluid for actuation of both the drive motors 40 and 41 and the hydraulic cylinder 32 associated with the hydraulic lift 26. A small gasoline engine of approximately ten horse power rating is sufficient to move the vehicle with very large and heavy trailers. The engine 46 also serves to charge a battery 51 supplying the electric requirements of the vehicle 10.

As seen in FIG. 8, the transmission between the engine 46 and hydraulic pumps 42 and 43 is by way of a belt 55 trained over a single pulley 46A at the engine 46 and pulleys 42A and 43A on each of the pumps 42 and 43, respectively. The belt also has a belt tightener pulley 57. The various pulleys 42A, 43A, 46A, 51 and hydraulic pumps 42 and 43 are concealed under a safety shield or shroud 55 seen in FIGS. 1, 2 and 4.

Figure 5:
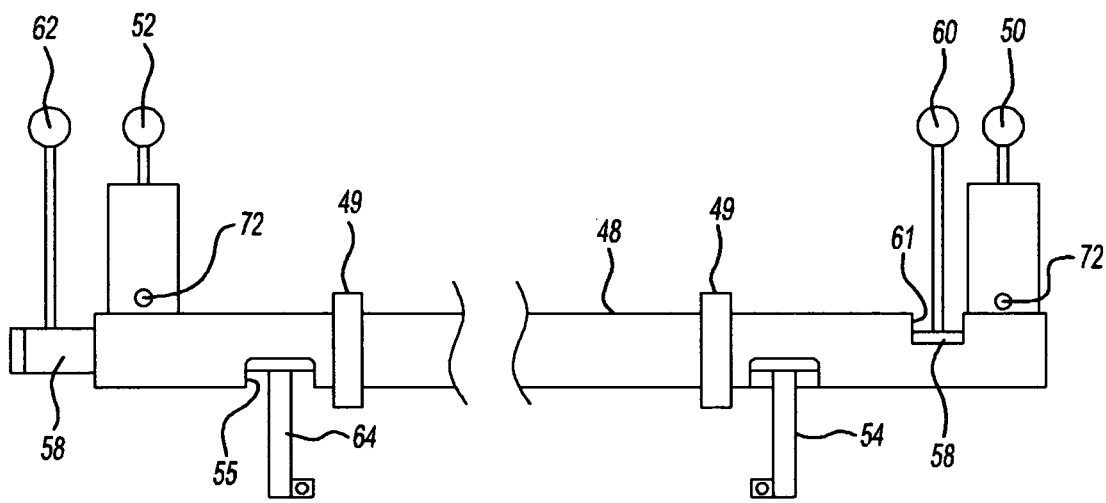
FIG. 5 is a more detailed view of the control levers at an enlarged scale as they would appear to the operator from the rear of the vehicle.

Very accurate steering and maneuverability of the unhitched trailer coupled to either the fifth wheel coupling 28 or the ball coupling 30 is achieved by a control assembly 47 forming the steering means which includes an outer tube 48 extending transversely and projecting outwardly beyond the side frame 20 and control support frame members 24. The outer tube 48 is journaled at bearings 49 as seen in FIGS. 1, 4 and 5 for rotation at the upper ends of the pair of angled support frame members 24. The tube 48 moves in response to movement of a lever 50 extending radially from one end of the outer tube 48 or a radially extending lever 52 mounted at the opposite end of the tube 48. The levers 50 and 52 are aligned with each other and either lever serves to rotate the tube 48 for the purpose of pivoting a crank arm 54 extending radially downwardly from tube 48 and having its free end pivotally connected to a push rod 56 extending to and controlling the hydraulic pump 42 connected to the motor 40 driving the right wheel 14 of the vehicle 10.

The outer tube 48 journals a smaller inner shaft 58 so that the tube 48 and shaft 58 are coaxial as seen in FIG. 5. A lever 60 projects radially from the inner shaft 58 through an opening 61 in the outer tube 48 adjacent to the control lever 52. A lever 62 is attached to a portion of the inner shaft 58 extending from the end of the outer tube 48 and is aligned with lever 60 at the opposite end of shaft 58. An arm 64 depends radially from shaft 58 through a slot 65 in outer tube 48 for connection to a control rod 45 associated with the hydraulic pump 43 delivering hydraulic fluid to the hydraulic motor 41 for controlling the left drive wheel 15. The right lever 50 and right lever 52 attached to the outer tube 48 control the right drive wheel 14 and the left levers 60 and 62 connected to the inner shaft 58 control the left drive wheel 15. This provides a duplication of control members at each side of the vehicle for steering the vehicle and giving versatility and a wide range of the positions for the operator controlling the vehicle extending from the left rear of the vehicle in which the two levers 52 and 62 can be controlled with one hand such as the right hand to a position at the right rear of the vehicle in which the levers 50 and 52 controlling the two drive wheels 14 and 15 can be controlled with the left hand.

One of the safety features of the control system of the trailer moving vehicle 10 is associated with the steering control levers 50 and 52 of the right drive wheel 14. As seen in FIG. 5. the control lever 50 is illustrated and is identical to the arrangement of the control lever 52 at the opposite end of the outer tube 48. The lever 50 has a base plate 70 fixed to the outer tube 48 as by welding. As seen in FIG. 5 lever 50 pivots about an axis of a pin indicated at 72 extending transversely of the axis of the outer tube 48. The lever 50 is allowed to pivot in a limited range determined by spaced stops 74. When the trailer moving vehicle is not being operated the levers 50 and 52 are biased away from the adjacent control levers 60 and 62 by a leaf spring 76. When the lever 50 is tilted toward the adjacent control lever 60, the leaf spring 76 is deflected and a push button 77 on the switch controlling the ignition system of the engine operating the vehicle 10 is closed. When the lever 50 is released the leaf spring biases the lever to its original position allowing the push button to return to its switch open position so that the ignition system is inactivated and the engine stops and so does the vehicle and its operation. In this manner the levers 50 and 52 act as dead man controls which requires that one or the other of the levers be actuated to depress the button on the switch before the engine of the vehicle can be started and the vehicle 10 operated.

A single control lever 78 for the valve 34 controlling the hydraulic lift cylinder 32 is mounted centrally of the vehicle also at waist height like the levers 50, 52, 60 and 62.

The drive wheels 14 and 15 are provided with mechanically actuated brakes (not shown) which act as parking brakes. The brakes are actuated by a pair of hand levers 82 acting through a pair of longitudinally movable rods 84 extending between the lever 82 and brakes at the wheels 14 and 15. Operation of either of the levers sets the brakes at both wheels.

Operation of the vehicle 10 with the engine running can be initiated by using control lever sets made up of levers 50, 60 or the control set made up of levers 52, 62 at opposite sides of the vehicle. To place the vehicle in motion the lever 50 or 52 must first be deflected to one side to close the switch button 77 (FIG. 6). Thereafter, the control lever can be manipulated to move the vehicle 10 forwardly by pushing the levers 50, 60 or 52, 62 in a forward direction. The degree of movement of the levers in the forward direction will determine the forward speed of rotation of the wheels, 14, 15. To turn the vehicle 10 it is necessary to cause one or the other of the wheels 14 or 15 to rotate at a different speed. This is accomplished by moving one of the levers in one of the sets a greater amount than the other which will result in the differential speed of the wheels to bring about steering. To cause reverse movement of the vehicle 10 the levers of one of the sets are pulled rearwardly. To bring the vehicle to a stop both levers 50, 60 or 52, 62 are moved to their intermediate or neutral position.

Maneuvering of vehicle 10 into alignment with the hitch of a trailer to be moved permits the operator to regulate the elevation of the fifth wheel coupler 26 and ball coupler 30 by movement of control lever 78 to direct hydraulic fluid to hydraulic cylinder 32 to raise or lower the couplers 26 and 30 to mate with the trailer couplers.

Unlike much of the prior art, in which steering is accomplished by a rudder arrangement for steering the rear wheel of the vehicle, the present trailer moving vehicle 10 does not rely on forward or rearward movement of the vehicle for steering. For example, a ninety degree turn can be accomplished without any forward movement of the vehicle 10 by rotating the drive wheels 14 in one direction and the other drive wheels 15 in the opposite direction. As viewed in FIG. 2 this would turn the frame 12 approximately at the axis of the fifth wheel hitch 28 or the ball coupling 30 without any appreciable forward or rearward movement of the frame or the trailer being maneuvered.

The various hydraulic lines between the hydraulic motors 40 and hydraulic pump 42 and the hydraulic lift or cylinder 32 and a valve 34 are not shown in the interest of simplifying the disclosure.

A vehicle for moving trailers which are not coupled to their normal towing vehicles has been provided in which steering is accomplished by a walking operator moving separate levers for each of a pair of drive wheels so that a pair of adjacent control levers controls the speed and direction of movement of the vehicle. Two sets of such levers are provided with one set at each of the rearward sides of the vehicle so an operator has a wide range of operating positions relative to the vehicle for moving the trailer being moved.

The invention claimed is:

1. A vehicle for moving a trailer uncoupled from a towing vehicle, comprising:
   an elongated chassis;
   a pair of drive wheels supported at spaced forward opposite sides of said chassis for rotation about a common axis transverse to said chassis;
   trailer coupler means being disposed on said frame intermediate and rearwardly of said wheels;
   a caster wheel assembly at the rear of said chassis free to rotate about a vertical axis in response to movement of said chassis;
   hydraulic rotary drive means for separately driving each of said drive wheel independently of each other; and
   steering means including a separate pivoting control lever for each of said drive wheels for controlling the speed and direction of rotation of said wheels, said control levers being disposed adjacent to each other and pivoted about a common transverse horizontal axis at the rear of said chassis by an operator positioned adjacent to said vehicle.

2. The vehicle of claim 1 wherein said hydraulic drive means includes a hydraulic motor directly coupled to each of said drive wheels.

3. The vehicle of claim 2 wherein each hydraulic motor is supplied with hydraulic fluid from a separate hydraulic pump.

4. The vehicle of claim 3 wherein each of said hydraulic motors is separately controlled by said steering means.

5. The vehicle of claim 1 wherein said steering means are disposed at one side of said vehicle and another set of steering means is disposed at the opposite side of said vehicle.

6. The vehicle of claim 5 wherein said steering means including said control levers on said drive wheels are disposed in pairs with the lever associated with the wheel on the same side of the vehicle being outward and the other lever for the wheel at the opposite side of the vehicle being inward.

7. The vehicle of claim 6 in which said levers at each side of said vehicle are disposed adjacent to each other so that they can be gripped by one hand of an operator.

8. The vehicle of claim 5 wherein one lever of each of said sets is biased to one side to hold a switch in its open position to permit operation of the hydraulic means and wherein said levers must be moved to the other side to close said switch to enable operation of said hydraulic means.

9. The vehicle of claim 1 wherein said trailer coupler means includes a fifth wheel coupler at its upper end and a ball coupler at its lower end and a hydraulic actuator to control elevation of said couplers.

10. The vehicle of claim 1 wherein said control levers are oriented so that the motor driving the wheel at one side of the vehicle is disposed at the same side and a lever controlling the motor for the other of said wheels is supported inboard of said lever at the same side.

11. The vehicle of claim 10 wherein said lever at the same side and said inboard lever are in side by side relationship and can be operated with a single hand of an operator walking next to the vehicle.

12. The vehicle of claim 11 wherein one lever at each side of said vehicles is pivoted for movement transversely of said vehicle and is normally biased to a first position in which said vehicle is not moving and must be manually moved by an operate to a second position to permit movement of said vehicle.

13. The vehicle of claim 1 wherein each of said pair of drive wheels is provided with a separate brake mechanism and a pair of brake control levers are disposed at opposite sides of the vehicle for actuating both of said brakes in response to movement of either of said brake control levers.

14. The vehicle of claim 13 wherein said pair of brake control levers are disposed in proximity to said pairs of control levers for said wheels.

15. A vehicle for moving a trailer uncoupled from a towing vehicle comprising:
    trailer couple means disposed on said frame for coupling to a trailer;
    a longitudinal frame having a forward end supported by a pair of drive wheels and a rearward end supported by a caster wheel fully rotatable about a vertical axis;
    a pair of hydraulic motors for supporting driving each of said pair of wheels;
    a separate control lever for each of said wheels at a first side of said vehicle forming a first set of controls; and
    a separate control lever for each of said wheels at a second side of said vehicle forming a second set of controls, said levers of said first and second sets of controls being operable separately to control both wheels of said vehicle from either side of said vehicle by an operator walking at that side.

16. The vehicle of claim 15 wherein said control levers of each of said sets are adjacent to each other for movement by one hand of an operator.

17. The vehicle of claim 15 wherein each of said wheels has a brake mechanism and a lever at each side of said vehicle adjacent to said sets of controls.

18. The vehicle of claim 15 wherein said trailer coupler means is elevated by a hydraulic cylinder, and a control for said cylinder is intermediate said sets of controls.

19. The vehicle of claim 15 wherein said trailer coupler means includes a fifth wheel coupler at its upper end and a ball coupler at its lower end and a hydraulic actuator to control elevation of said couplers.

* * * * *